Oct. 19, 1965 R. ADELL 3,212,661
DEVICE FOR HOLDING ADDITIVE FOR MOTOR
VEHICLE WINDSHIELD WASHING LIQUID
Filed Aug. 25, 1964 2 Sheets-Sheet 1
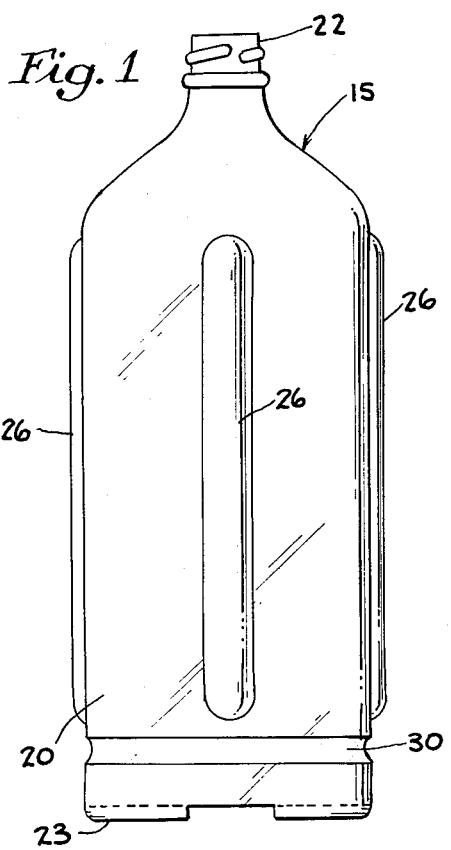
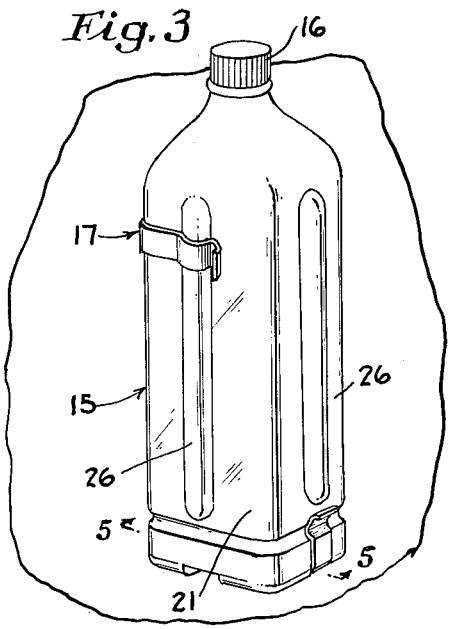
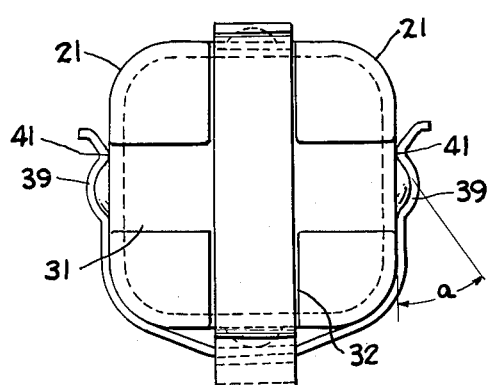
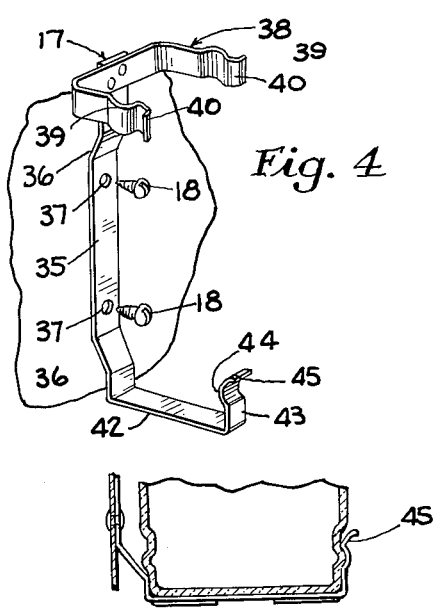
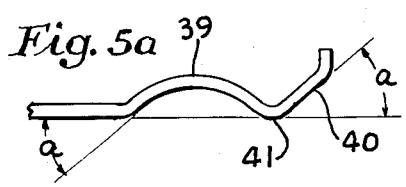
INVENTOR.
ROBERT ADELL
BY
ATTORNEY

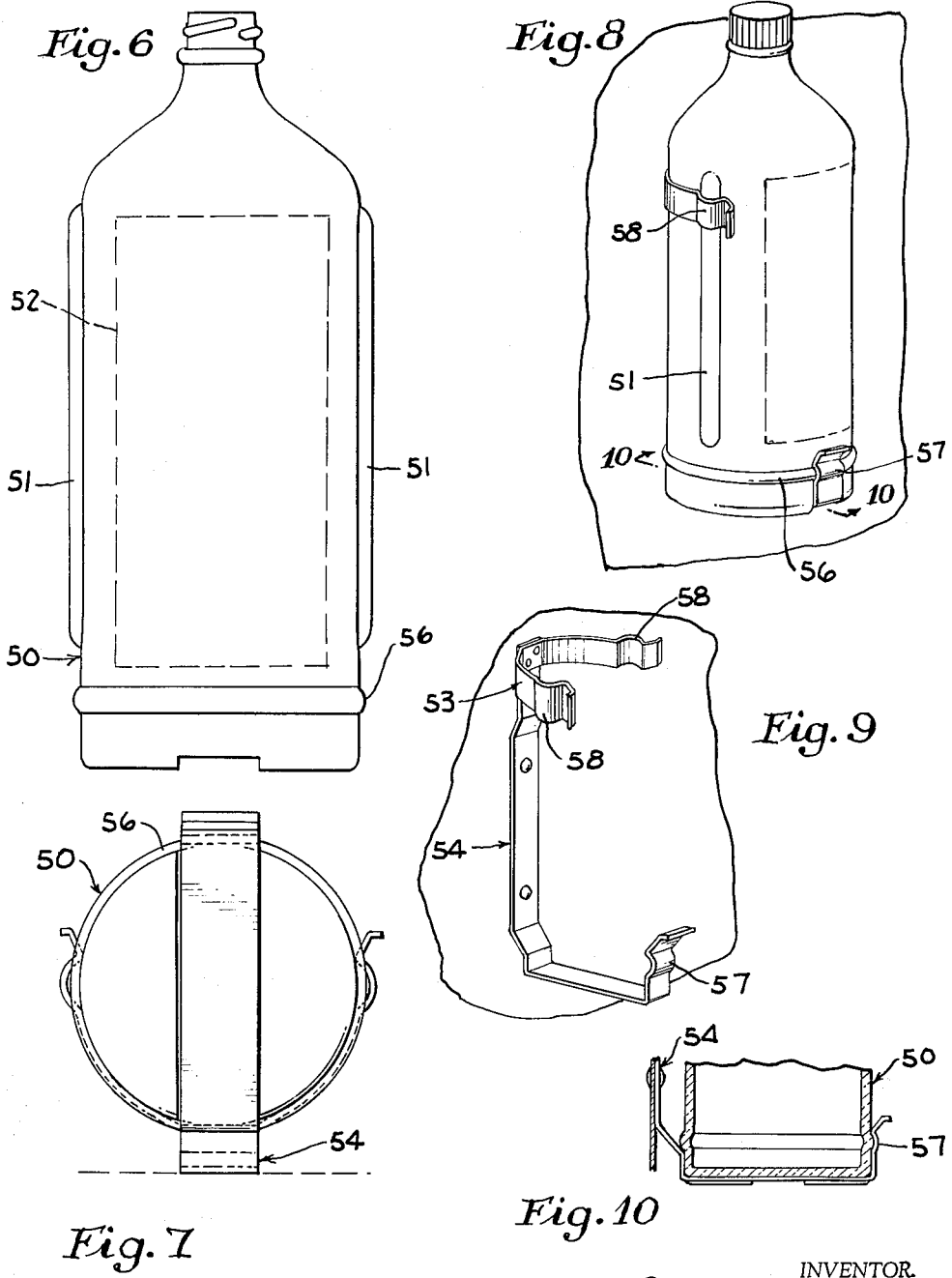

United States Patent Office 3,212,661
Patented Oct. 19, 1965

3,212,661
DEVICE FOR HOLDING ADDITIVE FOR MOTOR VEHICLE WINDSHIELD WASHING LIQUID

Robert Adell, Detroit, Mich., assignor to Adell Chemical Corporation, Detroit, Mich., a corporation of Michigan
Filed Aug. 25, 1964, Ser. No. 391,868
3 Claims. (Cl. 215—1)

This invention relates to an improved device for storing therein additive for the liquid used in windshield washer mechanisms of motor vehicles.

The advantages of storing such additive in a bottle or container suspended under the hood of the motor vehicle engine, rather than in the glove compartment of the vehicle, have now been fully realized. However, suspension of such a container under the engine hood in a manner preventing any rattling, and so secured as to present no danger of falling out even on the roughest roads, poses serious difficulties and problems in view of the fact that such requirement is coupled with the contradictory requirement that such container has to be easily removable from its mounting or suspension means and returnable in place without exertion of an appreciable effort.

Furthermore, such container or bottle has to be so constructed as to afford an easy hand grip thereon and present no danger of slipping out of operator's hand, even if his hands are oily or greasy because of previous handling of oil or grease covered objects.

One of the objects of the present invention is to provide an improved container or bottle for the liquid additive of the above nature, whereby the above difficulties and disadvantages are overcome and largely eliminated without introducing any new problems or increasing any appreciable manner the cost involved.

Another object of the present invention is to provide an improved bottle or container for the liquid additive of the nature specified above and an improved holder bracket therefor adapted to be installed under the engine hood of almost any motor vehicle, utilizing whatever available space may be found therein.

A further object of the present invention is to provide an improved bottle for the liquid additive of the above nature which holds the bottle in a secure and resiliently tight manner, and with the use of which the bottle can be easily taken out and returned to its place in the holder.

A further object of the present invention is to provide an improved device of the above nature which is simple and rugged in construction, dependable in operation and is relatively inexpensive to manufacture.

A further object of the present invention is to provide a device of the foregoing nature in which the holder bracket need not be manufactured in a precision manner in order to be able to receive and to hold the bottle properly, particularly with respect to the vertical location of the bottle holding members, and in which the same bracket holder can receive and hold bottles of several sizes and particularly of several heights, should this become necessary because of space limitations in the engine compartment, or in view of other considerations.

A further object of the present invention is to provide an improved bottle for holding liquid additive for motor vehicle windshield washers, which bottle may fit or be received and held by holder brackets for several different types or sizes.

A still further object of the present invention is to provide a device of the foregoing character, the bottle of which has ample space to receive necessary label with instructions.

Further objects and advantages of this invention will be apparent from the following description and appended claims, reference being had to the accompanying drawings forming a part of this specification, wherein like reference characters designate corresponding parts in the several views.

FIG. 1 is an elevational view of the bottle of square cross section for holding the liquid additive for windshield washer and adapted to be mounted in the engine compartment of a motor vehicle.

FIG. 2 is a bottom view of the bottle of FIG. 1, held in a holder bracket.

FIG. 3 is a perspective view of the construction shown in FIG. 2 in the top view, with the front of the bottle being turned toward the observer.

FIG. 4 is a perspective view of the holder bracket shown alone and in the same position as in FIG. 3.

FIG. 5 is a fragmentary elevational view of the construction of FIG. 3, but showing only the bottom portion thereof in a side view.

FIG. 5a is a fragmentary top view showing on an enlarged scale one free end of the C-shaped clip.

FIGS. 6–10 are views similar in part to FIGS. 1–5, respectively, but showing a device including a bottle of a round cross section and holder adapted to receive such a bottle.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

In the drawings there are shown, by way of example, two devices embodying the present invention. Referring specifically to FIGS. 1–5, the device illustrated therein comprises a bottle 15 having a cap 16 and a holder bracket 17 adapted to receive and to hold said bottle 15. The holder bracket is illustrated separately in FIG. 4 and is adapted to be mounted in any suitable place in the engine compartment of a motor vehicle and with the aid of any suitable means, such as with the use of self-tapping screws 18.

The bottle 15 is illustrated separately in FIG. 1. As shown in said figure, the bottle comprises a body portion 20 which in the embodiment illustrated in FIGS. 1–5 is of a square cross section with rounded corners, as indicated at 21. The upper portion of the body 20 converges upwardly to provide a neck 22 adapted to receive the cap 16 in a manner well known in the art. The lower end of the body 20 is closed by the provision of a bottom 23.

Along the body portion 20 and parallel to the longitudinal axis of the bottle there is provided a plurality, four in the embodiment illustrated in FIGS. 1–5, of deformation elements such as raised beads 26 extending substantially throughout the entire length of the body portion 20. The beads 26 may be of a segmental cross section.

In the lower portion of the body 20 and adjacent the bottom 23 of the bottle, there is provided a peripheral deformation element such as a groove 30 which may also be of a segmental cross section, as illustrated. In the bottom surface of the bottle, i.e. within the bottom 23 thereof, there are provided two recesses 31 and 32 arranged in a cross-like manner and having a suitable depth, such as one-half of the thickness of the bottom 23. Each of said recesses runs through the entire extent of the bottom, reaching from one side of the bottle to the other, with the center of the cross so formed substantially coinciding with the longitudinal axis of the bottle. The bottle is made from any suitable material, preferably transparent, such as glass or plastic.

The holder bracket 17 comprises an elongated piece 35 of resilient material, such as spring steel. The middle portion of the piece 35 is stamped out as illustrated at 36 to insure better contact of the bracket with the supporting wall, and to provide a guiding ramp for the bottom of the bottle, as explained further below. The portion 35 is provided with holes 37 adapted to receive screws 18. To the top end of the piece 35 there is secured in any suitable manner, such as by spot welding or riveting, as shown, a C-shaped clip 38 having its middle portion secured to the end of the piece 35 and its free ends formed to provide curls 39 adapted to fit with their inner surfaces over the raised beads 26, as is best illustrated in FIGS. 2 and 3. The extremities of the free ends of the clip 38 are bent outwardly to provide bottle guiding portions 40.

The angles $a$ formed by the tangents to the contacting inner surfaces of the curls 39 and outer surfaces of the curls 26 at roots 41 of the curls 39 are equal to approximately 45 degrees in order to insure that pull on the bottle in the forward direction, i.e. away from the piece 35, would operate to spread the ends of the clip 38 apart, causing them to ride over the raised beads 26 and thus permit withdrawal of the bottle.

The lower end of the piece 35 is bent horizontally to provide an extension or tongue 42 reaching in the installed position of the bottle under the bottom thereof to the other side, whereat it is bent upwardly to form upward extension 43 having an inwardly directed curl 44 provided on its end to engage the bottle at the peripheral groove 30, as is best shown in FIGS. 3 and 5. At the extremity of the curl 44 there is provided an upwardly extending bottle guiding portion 45.

In operation, with the holder bracket 17 being presumed to have been installed in an engine compartment, the bottle 15 holding liquid additive is inserted into the holder bracket 17 by placing its front lower edge on the lower bottle guiding extension 45, causing it to slide down toward the horizontal tongue 42, with the upper portions of the side edges of the bottle contacting the upper bottle guiding extensions 40 of the clip 38. Further pressure at the top of the bottle will cause spreading of the C-shaped clip with the rear lower edge of the bottom riding on the lower ramp 36 guiding the bottle downwardly. Pressure of the raised beads 26, which also form angles $a$ with the direction of the inserting effort, as is best shown in FIG. 5a, continues spreading of the C-shaped clip until the points 48, at the junction of the curl 39 and bottle guiding portions 40, ride over the highest points of the raised beads 26, whereupon the curls 39 snap in place on the said beads 26, embracing the bottle. At the same time the curl 44 snaps into the groove 30 and the extension 42 enters the recess 32.

It will now be seen, in view of the foregoing, that when the bottle 15 assumes its installed position in the bracket 17, as shown in FIG. 3, the forward movements of the top of the bottle are resisted in a resilient but yielding manner by the C-shaped spring clip 38, while similar movements of the bottom of the bottle are resisted by the extension 43 of the tongue 42. Rotative movements of the bottle are similarly resisted by said portions of the holder bracket. In addition, the tongue 42 being held within the recess 32 provides positive resistance to rotative movements of the bottle and permitting only slight such movements determined by the clearance between the walls of the recess 32 and the tongue 42, which movements are resiliently resisted within their limits by the spring clip and the upward extension of the tongue. The weight of the bottle and of its contents is supported by the tongue 42, while the upward movements of the bottle are resisted by the engagement of the bottle by the curl 44 at the groove 30. Thus, movements of the bottle 15 are resisted in every direction, with said resistance in the direction of withdrawal of the bottle being resisted in a resilient but yielding manner. Similarly, the effort necessary to insert the bottle in place is resisted also resiliently but yieldingly, requiring a relatively easy effort to return the bottle in place.

It will be understood that in the construction illustrated in FIGS. 1–5a, the bottle 15 will be received and held by the holder bracket 17 in any one of the four positions thereof, i.e. with any one of the four raised beads 26 being in front.

The construction of FIGS. 6–10 is substantially similar to that of FIGS. 1–5, with the exception that the bottle 50 thereof is of a circular cross section, as is best shown in FIG. 7, and only two raised beads, such as 51, are provided on the outer surface of the bottle in a diametrically opposed relation. Accordingly, the spring clip 53 of the holder bracket 54 is arcuately shaped, as shown in FIG. 9. This bottle is received by the holder bracket 54 in two positions only. However, elimination of the two raised beads clears the space on the body of the bottle for a label or provision of desired indicia in any other suitable manner. The space so provided is nearly one-half of the outer cylindrical surface of the bottle and therefore is ample not only for the identification indicia but also for ample instructions or other message. Such space, indicated in the drawing in dotted lines and designated by the numeral 52, is provided on both sides of the bottle in contemplation of it being received by the holder bracket in any of the two positions. Also, in the construction of FIGS. 6–10 a peripheral raised bead 56 is provided instead of a groove, such as 30 of the construction of FIGS. 1–5. Accordingly, the curl 57 of the holder bracket 54 is outwardly directed similarly to the upper curls 58 of the C-shaped clip 53.

It will be understood, however, that four beads such as 51 may also be used in bottles of round cross section, and that peripheral grooves rather than raised beads may also be used therein. However, disposition of the beads in the bottles of round cross section should preferably be equidistant, i.e. in the perpendicular planes intersecting at right angles at the axis of the bottle. Arrangement of the beads closer to the bracket should be avoided as decreasing the snap action of the bracket.

The use of two beads permits elimination of the cross-shaped recess at the bottom of the bottle and having only one recess, such as recess 32 of the construction shown in FIG. 2.

It will also be understood that in the construction of FIGS. 1–5, two raised beads instead of four may be used, and a raised bead may be substituted for the groove 30 such as one in the construction of FIGS. 6–10. It should also be appreciated that with the bottles of square or rectangular cross section, the raised beads need not be provided in the plane parallel to the two walls thereof and passing through the axis of the bottle but such beads may be off-set forwardly or rearwardly of the bottle, requiring longer or shorter holding fingers on the C-shaped clip. However, with such a construction, the bottle having two beads will be received by the bracket in one position only.

There is thus provided an improved device of the nature specified above whereby the objects of the present invention and numerous additional advantages are attained.

I claim:

1. A device for holding a supply of liquid additive for a windshield washer water container of a motor vehicle, said device comprising a bottle having at least two elongated raised beads provided on the outer surface of the opposite sides of the bottle and extending longitudinally thereof, a peripheral groove provided on the outer surface of the bottle near the bottom thereof, and a bracket made of spring material and adapted to be installed in an engine compartment of a motor vehicle to receive said bottle, said bracket comprising a strip of spring material having its lower end bent to provide an extension reaching under the bottom of the bottle to the other side thereof, and a C-shaped bottle-embracing clip provided at the top of said bracket and adapted to embrace said bottle near the top thereof, the ends of said clip being formed to engage said beads on opposite sides of the bottle to resist yieldingly and resiliently transverse movements and rotation of the bottle, with the extension of the lower end of the bracket being turned up to extend, when the bottle is in place in the bracket, toward said peripheral groove and shaped to engage the bottle at said groove to resist yieldingly and resiliently the upward movements of the bottle.

2. The device defined in claim 1, with said bottle being provided at its bottom surface with at least one through diametral recess adapted to receive the extension of the lower end of the bracket in order to provide positive means resisting the side and the rotative movements of the bottle.

3. A device for holding a supply of liquid additive for a windshield washer container of a motor vehicle, said device comprising a bottle having a body of a substantially uniform cross-section with a bottom and a converging top forming a throat, at least two elongated deformation elements provided on the outer surface at the opposite sides of the bottle and extending for a substantial portion of the height of the bottle body, said elements projecting from the general configuration of said outer surface of the bottle, a peripheral deformation element provided on the outer surface of the bottle body near the bottom thereof, and a bracket made of spring material and adapted to be installed in an engine compartment of a motor vehicle to receive said bottle, said bracket comprising a strip of spring material having its lower end bent forward to provide an extension reaching under the bottom of the bottle to the opposite side thereof to support the bottle and to resist resiliently downward movements thereof, and a C-shaped bottle-embracing clip provided at the top of said bracket and adapted to embrace said bottle, the ends of said clip being formed to engage said elongated deformations intermediate their respective ends on the opposite sides of the bottle to resist yieldingly and resiliently transverse movements and rotation of the bottle, with the extension of the lower end of the bracket strip being turned up to form a prong adapted to resist forward movements of the bottom of the bottle, said prong extending, when the bottle is in place in the bracket, to said peripheral deformation element and to engage the bottle thereat to resist upward movements of the bottle.

References Cited by the Examiner
UNITED STATES PATENTS 3,033,404   5/62   Adell _____ 215—100

THERON E. CONDON, *Primary Examiner.*